United States Patent
Kashiwagi et al.

(10) Patent No.: US 10,648,512 B2
(45) Date of Patent: May 12, 2020

(54) CONSTANT VELOCITY JOINT

(71) Applicant: JTEKT CORPORATION, Osaka-shi (JP)

(72) Inventors: Isashi Kashiwagi, Kariya (JP); Takashi Okazaki, Anjo (JP); Tomotaka Minami, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 303 days.

(21) Appl. No.: 15/792,835

(22) Filed: Oct. 25, 2017

(65) Prior Publication Data
US 2018/0119745 A1    May 3, 2018

(30) Foreign Application Priority Data

Oct. 28, 2016 (JP) .................................. 2016-211816

(51) Int. Cl.
*F16D 3/223* (2011.01)
*F16D 3/227* (2006.01)

(52) U.S. Cl.
CPC ............. *F16D 3/223* (2013.01); *F16D 3/227* (2013.01); *F16D 2003/22303* (2013.01); *F16D 2003/22309* (2013.01); *Y10S 464/906* (2013.01)

(58) Field of Classification Search
CPC ..................... F16D 3/223; F16D 3/227; F16D 2003/22309; F16D 2003/22303; Y10S 464/906

USPC ......................................................... 464/144
See application file for complete search history.

(56) References Cited

U.S. PATENT DOCUMENTS

| | | | | |
|---|---|---|---|---|
| 3,613,397 A | * | 10/1971 | Okoshi | F16D 3/227 464/144 |
| 5,186,687 A | * | 2/1993 | Hayashi | F16D 3/223 464/144 |
| 7,407,441 B2 | * | 8/2008 | Matsumoto | F16D 3/2237 464/906 |

FOREIGN PATENT DOCUMENTS

JP    2001-347845    12/2001

* cited by examiner

*Primary Examiner* — Greg Binda
(74) *Attorney, Agent, or Firm* — Oblon, McClelland, Maier & Neustadt, L.L.P.

(57) ABSTRACT

A constant velocity joint includes balls each rollably supported by an associated one of outer ball grooves and an associated one of inner ball grooves facing each other such that the inclined direction of the associated outer ball groove relative to a central axis of an outer joint member is opposite to the inclined direction of the associated inner ball groove relative to a central axis of an inner joint member. The inner joint member includes escape portions to allow escape of the balls from the inner ball grooves to a first side of the central axis of the inner joint member. Each of the escape portions is provided at least between an end face at the first side of the central axis of the inner joint member and a first rolling guide lateral surface of the associated inner ball groove that forms an acute angle with the end face.

5 Claims, 5 Drawing Sheets

CONSTANT VELOCITY JOINT

INCORPORATION BY REFERENCE

The disclosure of Japanese Patent Application No. 2016-211816 filed on Oct. 28, 2016, including the specification, drawings and abstract, is incorporated herein by reference in its entirety.

BACKGROUND OF THE INVENTION

1. Field of the Invention

The invention relates to constant velocity joints.

2. Description of the Related Art

Japanese Patent Application Publication No. 2001-347845 (JP 2001-347845 A) discloses an automobile propeller shaft to reduce impact on an automobile body when an excessive load is applied thereto. A cross groove joint is used for the automobile propeller shaft. Application of an excessive load to the cross groove joint causes balls to be detached from an outer joint member. This causes an inner joint member and a stub shaft to move into a hollow portion of a companion flange.

A cross groove joint includes a plurality of balls held by a cage. Each ball is held in an associated window that is an opening defined in the cage, so that the cage limits the range of motion of each ball. Thus, disengagement of an inner joint member from the cage involves providing large windows so as to increase the range of motion of each ball. This narrows cage bars of the cage each provided between the windows adjacent to each other, resulting in a reduction in strength of the cage.

SUMMARY OF THE INVENTION

An object of the invention is to provide a constant velocity joint that enables disengagement of an inner joint member from a cage upon application of an excessive load, while preventing a reduction in strength of the cage.

A constant velocity joint according to an aspect of the invention includes a tubular outer joint member, an inner joint member, a plurality of balls, and a cage. The inner joint member is disposed inward of the outer joint member. The balls are configured to transmit torque between the outer joint member and the inner joint member. The cage is disposed between an inner peripheral surface of the outer joint member and an outer peripheral surface of the inner joint member. The cage includes windows each configured to hold an associated one of the balls. The outer joint member includes outer ball grooves each extending in an inclined direction relative to a central axis of the outer joint member. The inner joint member includes inner ball grooves each extending in an inclined direction relative to a central axis of the inner joint member. Each of the balls is rollably supported by an associated one of the outer ball grooves and an associated one of the inner ball grooves. The associated outer ball groove and the associated inner ball groove face each other such that the inclined direction of the associated outer ball groove relative to the central axis of the outer joint member is opposite to the inclined direction of the associated inner ball groove relative to the central axis of the inner joint member.

The inner joint member further includes escape portions configured to allow escape of the balls from the inner ball grooves to a first side of the central axis of the inner joint member. Each of the escape portions is provided at least between an end face of the inner joint member located at the first side of the central axis of the inner joint member and a rolling guide lateral surface of an associated one of the inner ball grooves that forms an acute angle with the end face.

The constant velocity joint according to the above aspect is configured such that when the balls enter a region where the escape portions are provided from the inner ball grooves upon application of an excessive load to the constant velocity joint, the balls are guided to the first side of the central axis of the inner joint member by the outer ball grooves, so that the balls are detached from the inner joint member. Detachment of the balls from the inner joint member enables disengagement of the inner joint member from the outer joint member, the cage, and the balls. Thus, the inner joint member is movable relative to the outer joint member, the cage, and the balls.

In this aspect, an increase in the circumferential dimension of each window of the constant velocity joint is prevented more effectively than when no escape portions are provided. Thus, the constant velocity joint enables disengagement of the inner joint member from the cage upon application of an excessive load, while preventing a reduction in strength of the cage.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
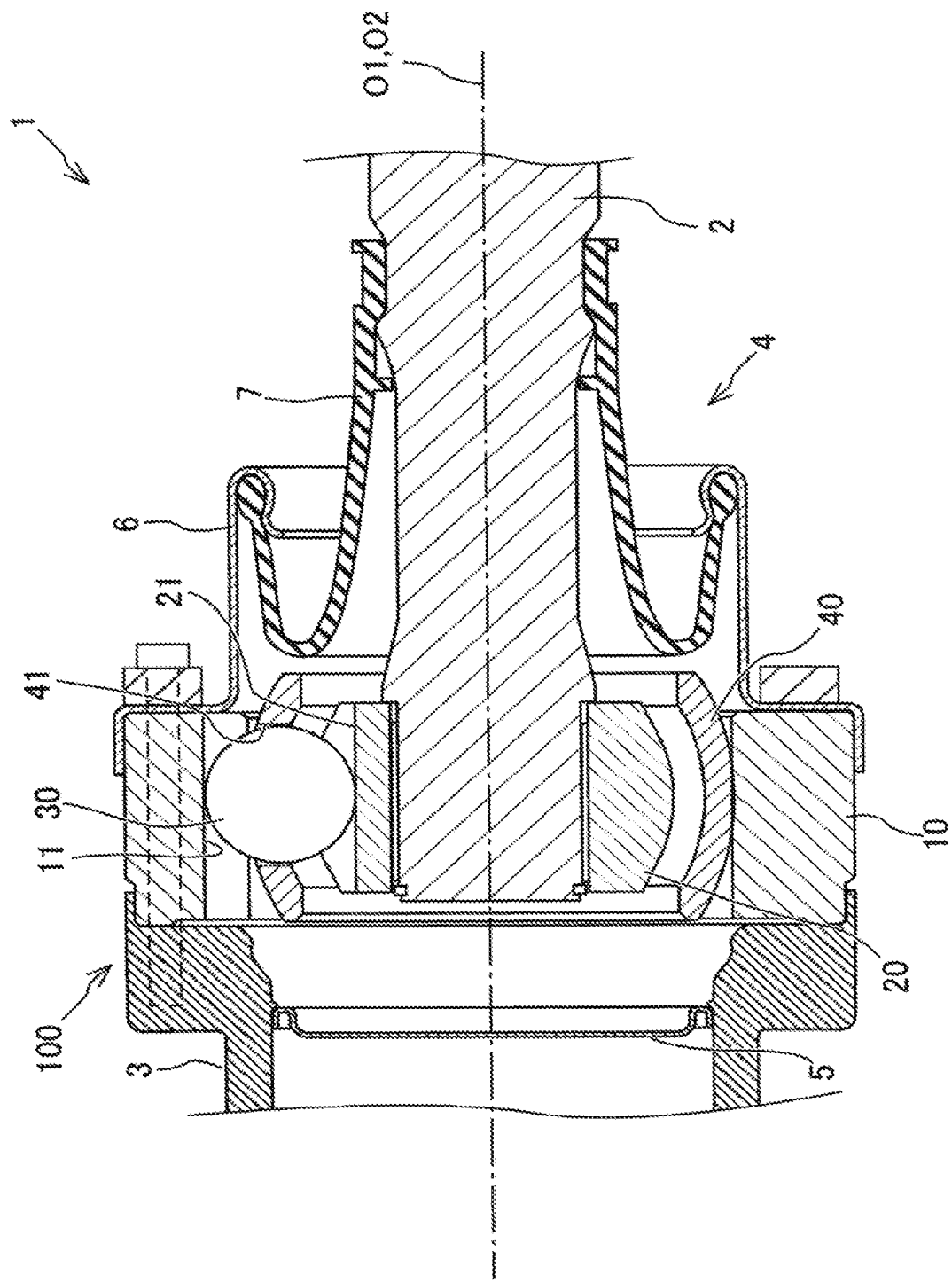
FIG. 1 is a cross-sectional view of a propeller shaft including a constant velocity joint according to an embodiment of the invention, with the constant velocity joint having a joint angle of zero degrees.

A constant velocity joint 100 according to an embodiment of the invention will be described below with reference to the drawings. First, the constant velocity joint 100 according to the embodiment of the invention will be described with reference to FIG. 1. This embodiment will be described on the assumption that a propeller shaft 1 includes the constant velocity joint 100. The constant velocity joint 100 is a cross groove joint. This means that the joint center of the constant velocity joint 100 is movable along the axis of the constant velocity joint 100. As illustrated in FIG. 1, the constant velocity joint 100 mainly includes an outer joint member 10, an inner joint member 20, a plurality of balls 30, and a cage 40.

The outer joint member 10 has a tubular shape. The inner peripheral surface of the outer joint member 10 is provided with a plurality of outer ball grooves 11. The outer ball grooves 11 each extend in an inclined direction relative to a central axis O1 of the outer joint member 10. The outer ball grooves 11 are provided such that the direction of inclination of a first one of the outer ball grooves 11 relative to the central axis O1 is opposite to the direction of inclination of a second one of the outer ball grooves 11 located adjacent to the first one of the outer ball grooves 11 in the circumferential direction of the outer joint member 10. The direction of inclination of each outer ball groove 11 may hereinafter be referred to as the "inclined direction of the outer ball groove 11".

The inner joint member 20 has a tubular shape. The outer peripheral surface of the inner joint member 20 is provided with a plurality of inner ball grooves 21. The inner ball grooves 21 each extend in an inclined direction relative to a central axis O2 of the inner joint member 20. The inner ball grooves 21 are provided such that the direction of inclination of a first one of the inner ball grooves 21 relative to the central axis O2 is opposite to the direction of inclination of a second one of the inner ball grooves 21 located adjacent to the first one of the inner ball grooves 21 in the circumferential direction of the inner joint member 20. The direction of inclination of each inner ball groove 21 may hereinafter be referred to as the "inclined direction of the inner ball groove 21".

Each of the balls 30 is rollably supported by the associated inner and outer ball grooves 21 and 11 facing each other such that the inclined directions of the inner and outer ball grooves 21 and 11 are opposite to each other. The balls 30 transmit torque between the outer joint member 10 and the inner joint member 20. The cage 40 is disposed between the inner peripheral surface of the outer joint member 10 and the outer peripheral surface of the inner joint member 20. The cage 40 includes windows 41 each configured to hold an associated one of the balls 30.

FIG. 1 illustrates the constant velocity joint 100 having a joint angle of zero degrees. The joint angle is an angle formed between the central axis O1 of the outer joint member 10 and the central axis O2 of the inner joint member 20. A portion of the cross-sectional view of FIG. 1 above the central axis O1 of the outer joint member 10 and the central axis O2 of the inner joint member 20 illustrates the outer ball groove 11, the inner ball groove 21, the ball 30, and the window 41 of the cage 40, but a portion of the cross-sectional view of FIG. 1 below the central axis O1 of the outer joint member 10 and the central axis O2 of the inner joint member 20 does not illustrate the outer ball groove 11, the inner ball groove 21, the ball 30, or the window 41 of the cage 40.

The propeller shaft 1 mainly includes the constant velocity joint 100, a stub shaft 2, a tube 3, a boot unit 4, and a defining member 5. The stub shaft 2 is coaxially coupled to the inner joint member 20. The stub shaft 2 is extended to a first axial side (i.e., the right side of FIG. 1) from the inner joint member 20. The tube 3 has a cylindrical shape. The tube 3 is coaxially secured to the outer joint member 10. The tube 3 is extended to a second axial side (i.e., the left side of FIG. 1) from the outer joint member 10.

The boot unit 4 includes a boot retaining metal fitting 6 and a boot body 7. A first axial end of the boot retaining metal fitting 6 (i.e., the right end of the boot retaining metal fitting 6 in FIG. 1) is secured to the outer peripheral surface of the stub shaft 2. A second axial end of the boot retaining metal fitting 6 (i.e., the left end of the boot retaining metal fitting 6 in FIG. 1) is fastened to the outer peripheral surface of the outer joint member 10 with a bolt or bolts (not illustrated).

The defining member 5 is a disk member. The defining member 5 is secured to a portion of the tube 3 connected to the outer joint member 10, with an interference provided therebetween such that the defining member 5 is press-fitted to this portion of the tube 3. The defining member 5 defines an inner space of the outer joint member 10 and an inner space of the tube 3. The inner space of the outer joint member 10 is filled with grease serving as a lubricant. The defining member 5 prevents leakage of the grease to the inner space of the tube 3. The defining member 5 moves further into the tube 3 upon application of a large load from a first side of the central axis O1 of the outer joint member 10 to a second side of the central axis O1 of the outer joint member 10.

Figure 2:
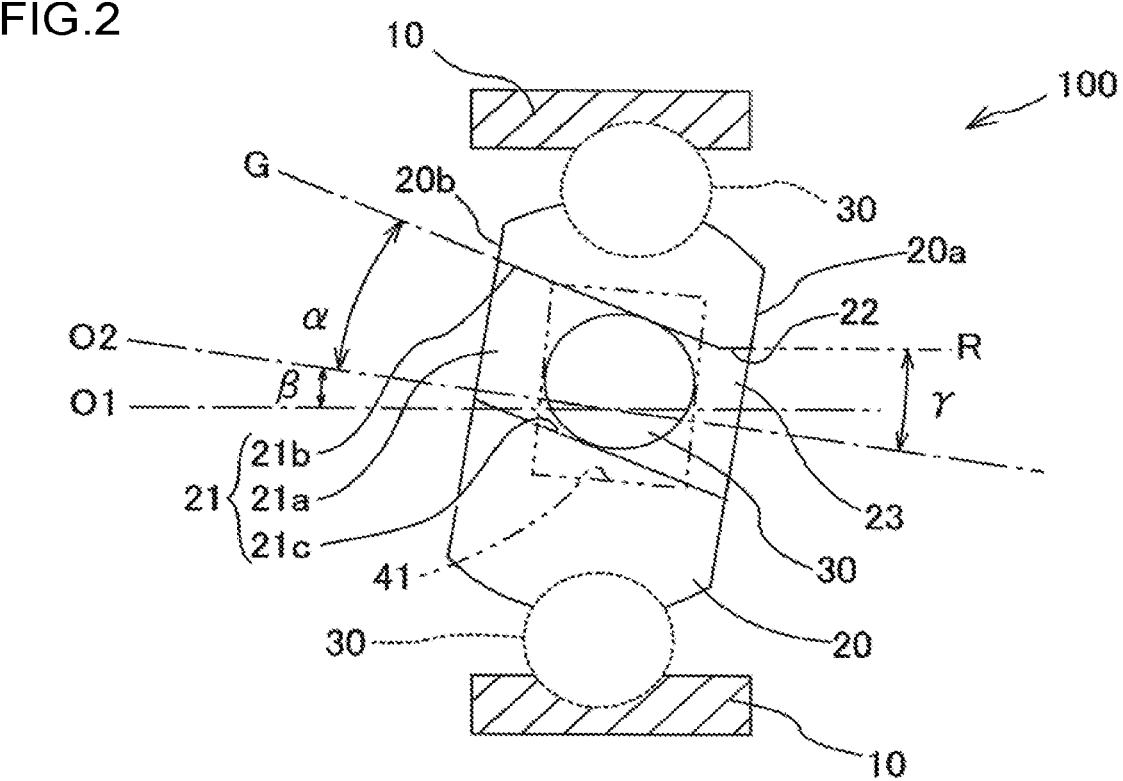
FIG. 2 is a diagram schematically illustrating the constant velocity joint having a maximum joint angle.

The details of the inner ball groove 21 and an escape portion 22 will be described with reference to FIG. 2. FIG. 2 is a cross-sectional view of the constant velocity joint 100 as viewed in a direction perpendicular to a plane passing through the central axis O1 of the outer joint member 10 and the central axis O2 of the inner joint member 20. For simplification of illustration, only one of the inner ball grooves 21 that is located closest to a viewer viewing the constant velocity joint 100 in this direction is illustrated in FIG. 2, and the other inner ball grooves 21 are not illustrated in FIG. 2. The view of the constant velocity joint 100 in this direction will hereinafter be referred to as a "predetermined side view". The right side of FIG. 2 corresponds to the right side of FIG. 1 where the small-diameter clamp member 7 is located, and the left side of FIG. 2 corresponds to the left side of FIG. 1 where the tube 3 is located.

In FIG. 2, β represents a maximum joint angle, and α represents an inclination angle of the inner ball groove 21 relative to the central axis O2 of the inner joint member 20. Although not illustrated, the inclination angle of the associated outer ball groove 11 is similar to the inclination angle α of the inner ball groove 21. In the predetermined side view, the inner ball groove 21 illustrated in FIG. 2 is inclined away from the central axis O1 of the outer joint member 10 with respect to the central axis O2 of the inner joint member 20. In other words, in the predetermined side view, the inner ball groove 21 is inclined relative to the central axis O1 of the outer joint member 10 by an angle (α+β).

FIG. 2 illustrates the constant velocity joint 100 whose joint center is located at a central position in a normal moving range. In FIG. 2, the position of the window 41 is indicated by the long dashed double-short dashed line. Each ball 30 is located at the circumferential center of the associated window 41.

Each inner ball groove 21 includes a rolling guide bottom surface 21a, a first rolling guide lateral surface 21b, and a second rolling guide lateral surface 21c. Each inner ball groove 21 is arc-shaped and recessed in a cross section perpendicular to the longitudinal direction of the inner ball groove 21. The rolling guide bottom surface 21a defines the bottom of the arc-shaped and recessed cross section. The first rolling guide lateral surface 21b defines one of the lateral surfaces of the arc-shaped and recessed cross section. The second rolling guide lateral surface 21c defines the other lateral surface of the arc-shaped and recessed cross section.

The first rolling guide lateral surface 21b defines an upper ridge of the inner ball groove 21 illustrated in FIG. 2 (i.e., an upper edge of the inner ball groove 21 in FIG. 2). In the predetermined side view, the first rolling guide lateral surface 21b forms an acute angle with an end face 20a of the inner joint member 20 located at a first side of the central axis O2 of the inner joint member 20 (i.e., facing toward the small-diameter clamp member 7). In the predetermined side view, the first rolling guide lateral surface 21b forms an obtuse angle with an end face 20b of the inner joint member 20 located at a second side of the central axis O2 of the inner joint member 20 (i.e., facing toward the tube 3).

The second rolling guide lateral surface 21c defines a lower ridge of the inner ball groove 21 illustrated in FIG. 2 (i.e., a lower edge of the inner ball groove 21 in FIG. 2). In the predetermined side view, the second rolling guide lateral surface 21c forms an obtuse angle with the end face 20a of the inner joint member 20 located at the first side of the central axis O2 of the inner joint member 20 (i.e., facing toward the small-diameter clamp member 7). In the predetermined side view, the second rolling guide lateral surface 21c forms an acute angle with the end face 20b of the inner joint member 20 located at the second side of the central axis O2 of the inner joint member 20 (i.e., facing toward the tube 3).

The inner joint member 20 includes the escape portions 22 in addition to the inner ball grooves 21. Each escape portion 22 serves to allow escape of the associated ball 30 from the associated inner ball groove 21 to the first side of the central axis O2 of the inner joint member 20. Each escape portion 22 is provided between the associated first rolling guide lateral surface 21b and the end face 20a located at the first side of the central axis O2 of the inner joint member 20 (i.e., facing toward the small-diameter clamp member 7). Suppose that the first rolling guide lateral surface 21b is extended to the end face 20a. In this case, the escape portion 22 is provided by cutting out a portion of the first rolling guide lateral surface 21b connected to the end face 20a. A region where the escape portions 22 are provided is defined as an "escape region 23".

Specifically, each escape portion 22 is a rolling guide lateral surface configured to guide the associated ball 30 in an inclined direction relative to the central axis O2 of the inner joint member 20. This inclined direction is opposite to the inclined direction of the associated inner ball groove 21. In FIG. 2, the inner ball groove 21 is inclined in a clockwise direction relative to the central axis O2 of the inner joint member 20, but the escape portion 22 is inclined in a counterclockwise direction relative to the central axis O2 of the inner joint member 20. An inclination angle γ of the escape portion 22 relative to the central axis O2 of the inner joint member 20 is set to be equal to or greater than the maximum joint angle ß.

Each escape portion 22 is provided only between the associated first rolling guide lateral surface 21b and the end face 20a. In other words, no escape portion 22 is provided between the associated first rolling guide lateral surface 21b and the end face 20b, between the associated second rolling guide lateral surface 21c and the end face 20a, or between the associated second rolling guide lateral surface 21c and the end face 20b.

Figure 3:
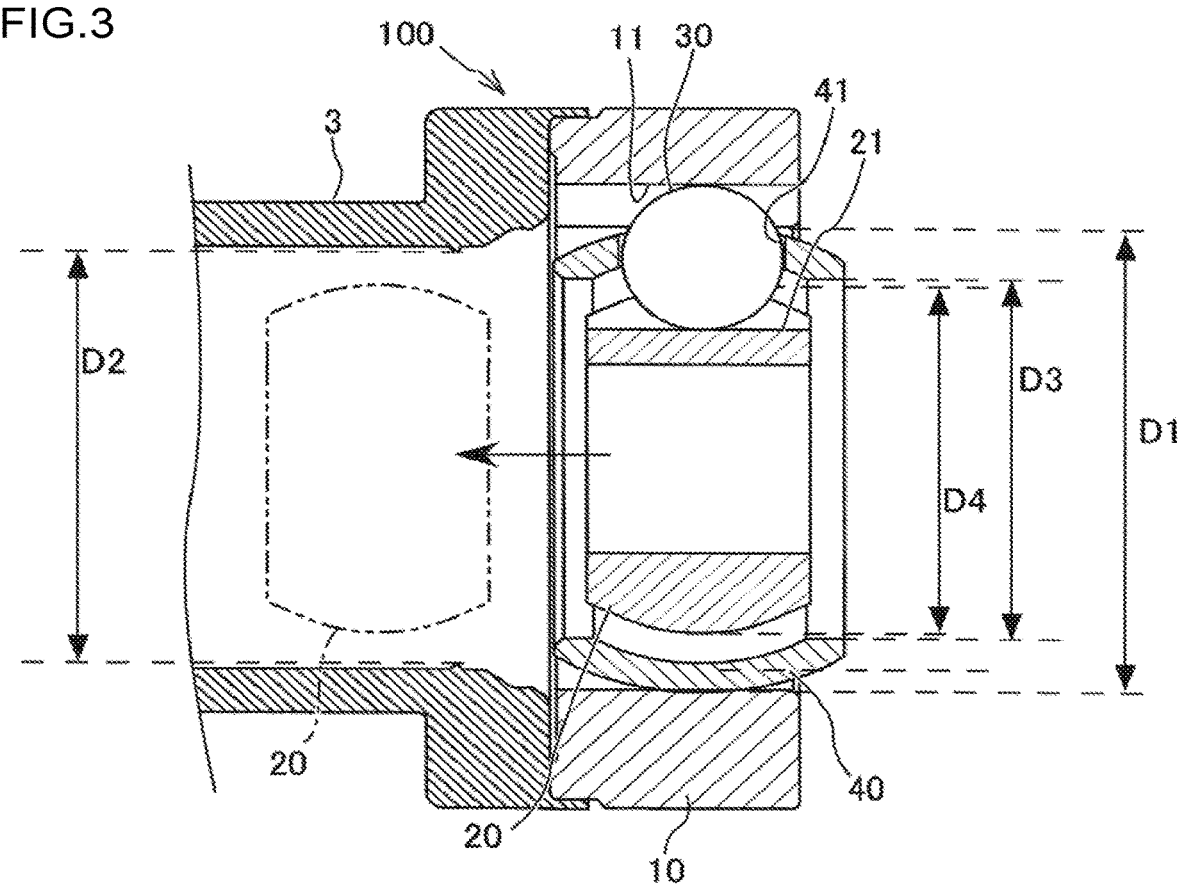
FIG. 3 is a cross-sectional view of the constant velocity joint having a joint angle of zero degrees.

Referring now to FIG. 3, the dimensions of the inner joint member 20, the cage 40, and the tube 3 will be described. In FIG. 3, D1 represents the maximum outside diameter of the cage 40, and D3 represents the minimum bore diameter of the cage 40. In FIG. 3, D2 represents the minimum bore diameter of a portion of the tube 3 connected to the outer joint member 10, and D4 represents the maximum outside diameter of the inner joint member 20. The minimum bore diameter D2 of the tube 3 corresponds to the bore diameter of an opening of the outer joint member 10 adjacent to the tube 3.

As illustrated in FIG. 3, the maximum outside diameter D1 of the cage 40 is larger than the minimum bore diameter D2 of the tube 3. Thus, if the cage 40 moves to the tube 3 from the outer joint member 10, the cage 40 will interfere with an inner peripheral surface of the tube 3 adjacent to the bottom surface of the outer joint member 10 irrespective of the joint angle. This prevents the cage 40 from being disengaged from the outer joint member 10, so that the cage 40 does not move into the inner space of the tube 3.

The maximum outside diameter D4 of the inner joint member 20 is smaller than the minimum bore diameter D3 of the cage 40. Thus, when the inner joint member 20 moves along the central axis O2 relative to the cage 40, the outer peripheral surface of the inner joint member 20 will not be caught by the cage 40 irrespective of the joint angle. In other words, disengagement of the inner joint member 20 from the cage 40 is enabled by merely detaching the balls 30 from the inner joint member 20. Disengagement of the inner joint member 20 from the cage 40 allows the inner joint member 20 to move into the inner space of the tube 3 together with the defining member 5.

Referring now to FIG. 2 and FIGS. 4A to 4C, the following description discusses how the inner joint member 20 is disengaged from the cage 40 when an excessive load is applied to the inner joint member 20. As illustrated in FIG. 2, during normal use of the constant velocity joint 100, each ball 30 rolls along the associated inner ball groove 21 and does not enter the escape region 23.

Figure 4A:
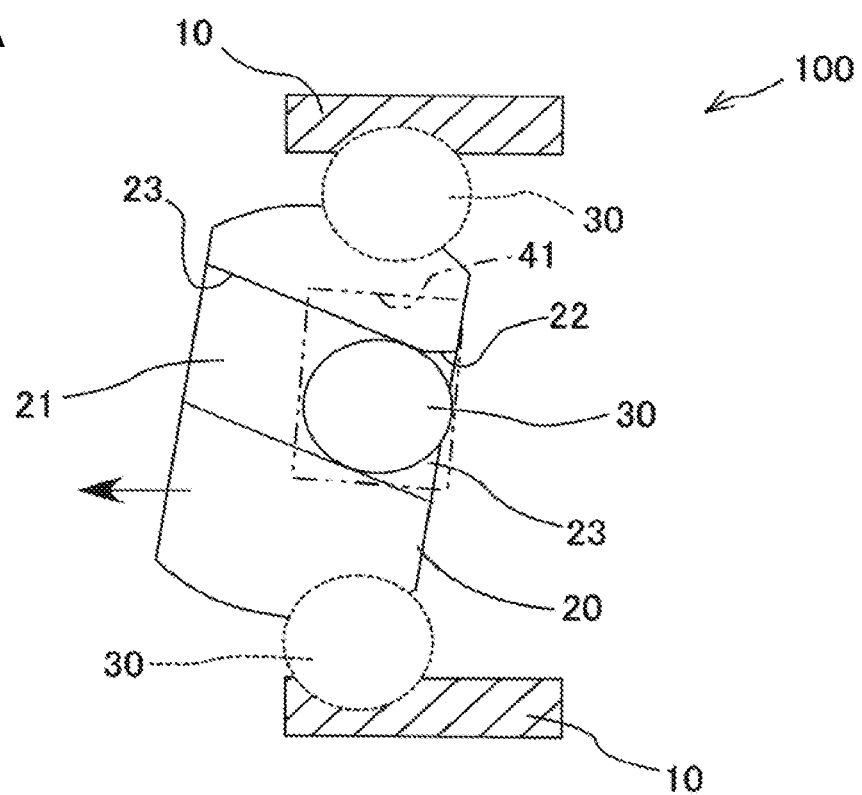
FIG. 4A is a diagram schematically illustrating the constant velocity joint, with its ball rolling along an associated inner ball groove.

As illustrated in FIG. 4A, application of an excessive load to the inner joint member 20 causes the inner joint member 20 to move to the tube 3 beyond the normal use range of the outer joint member 10. In this case, the cage 40 located in an opening of the outer joint member 10 where the stub shaft 2 (see FIG. 1) is coupled to the inner joint member 20 moves relative to the inner joint member 20, so that the ball 30 moving along the inner ball groove 21 enters the escape region 23. When a transition is made from the state illustrated in FIG. 2 to the state illustrated in FIG. 4A, the ball 30 moves to a position deviated from the circumferential center of the window 41 (i.e., a position deviated in the up-down direction in FIG. 2 and FIG. 4A).

During this transition, if no escape portion 22 exists, the ball 30 will be sandwiched between the first rolling guide lateral surface 21b of the inner ball groove 21 and the cage bar of the cage 40 so as to restrict detachment of the ball 30 from the inner ball groove 21. In this embodiment, however, the inner joint member 20 of the constant velocity joint 100 is provided with the escape portions 22 each disposed between the associated first rolling guide lateral surface 21b and the end face 20a. Thus, the ball 30 that has entered the escape region 23 does not receive a restricting force that is applied to the ball 30 when the ball 30 is located in the inner ball groove 21. Consequently, if circumferential movement of each ball 30 held in the associated window 41 is restricted by the associated cage bar of the cage 40 (see FIG. 1), each escape portion 22 would allow movement of the associated ball 30. Each cage bar of the cage 40 is a portion of the cage 40 provided between the windows 41 circumferentially adjacent to each other.

More specifically, each escape portion 22 is configured to guide the associated ball 30 in an inclined direction opposite to the inclined direction of the associated inner ball groove 21. Each outer ball groove 11 (FIG. 1) that supports the ball 30 between the outer ball groove 11 and the associated inner ball groove 21 in a rollable manner also guides the ball 30 in an inclined direction opposite to the inclined direction of the associated inner ball groove 21.

Figure 4B:
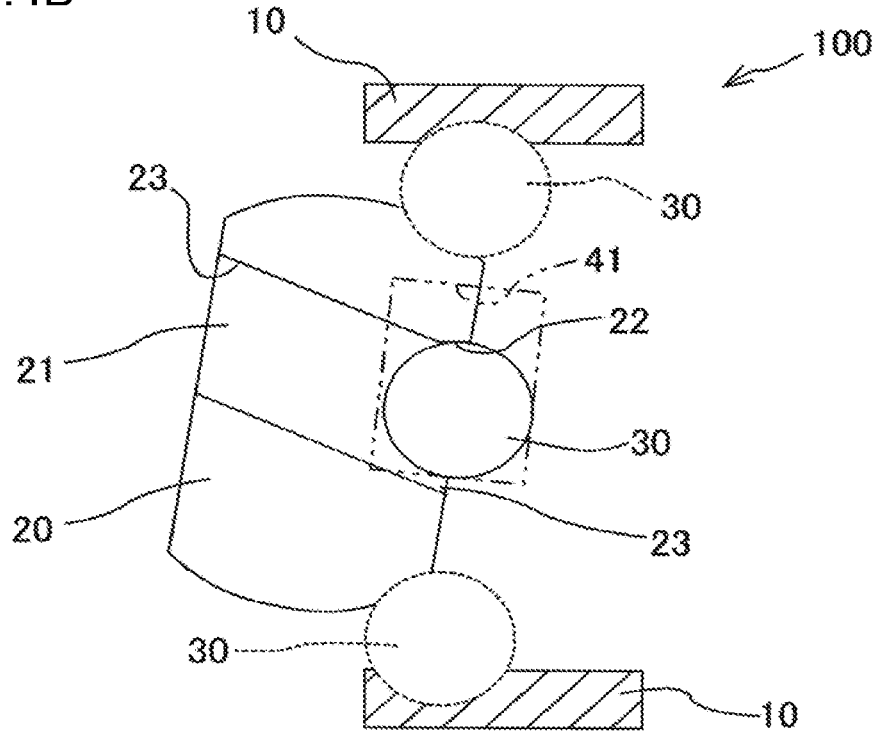
FIG. 4B is a diagram schematically illustrating the constant velocity joint, with its ball moving into an escape region from the associated inner ball groove.
Figure 4C:
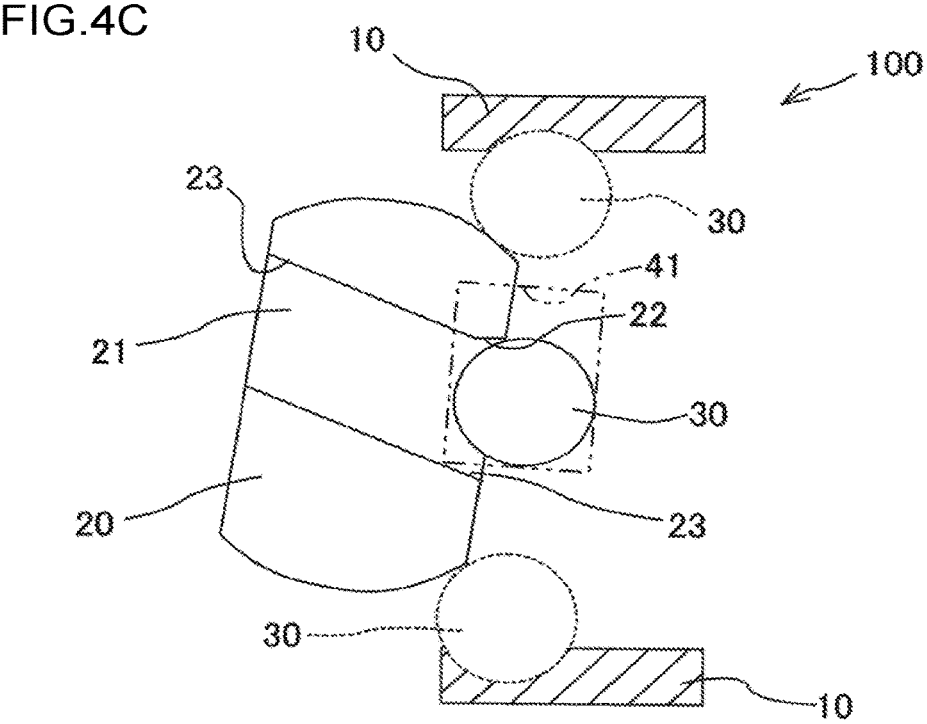
FIG. 4C is a diagram schematically illustrating the constant velocity joint, with its ball being detached from the inner joint member.

Thus, the inner joint member 20 and the cage 40 (see FIG. 1) make a transition from the state illustrated in FIG. 4A to the state illustrated in FIG. 4B, and then make a transition from the state illustrated in FIG. 4B to the state illustrated in FIG. 4C. Specifically, the ball 30 that has entered the escape region 23 is guided along the escape portion 22 and the outer ball groove 11, so that the ball 30 located in the opening of the outer joint member 10 illustrated in FIG. 1 where the stub shaft 2 is coupled to the inner joint member 20 rolls so as to move to the first side of the central axis O2 of the inner joint member 20 relative to the inner joint member 20. This causes detachment of the ball 30 from the inner joint member 20. Detachment of all the balls 30 from the inner joint member 20 causes the inner joint member 20 to be disengaged from the cage 40 and moved to the second side of the central axis O1 of the outer joint member 10 (i.e., to the left side of FIG. 4C or to the tube 3 illustrated in FIG. 1). This results in movement of the inner joint member 20 and the stub shaft 2 (see FIG. 1) coupled to the inner joint member 20 into the inner space of the tube 3.

As described above, the constant velocity joint 100 included in the propeller shaft 1 enables disengagement of the inner joint member 20, to which the stub shaft 2 is coupled, from the cage 40 upon application of an excessive load to the stub shaft 2. In this case, the propeller shaft 1 allows the inner joint member 20 and the stub shaft 2 (see FIG. 1) coupled to the inner joint member 20 to move into the inner space of the tube 3. Consequently, the constant velocity joint 100 is able to absorb impact caused by the load applied to the stub shaft 2.

In the predetermined side view, the inner ball groove 21 illustrated in FIG. 2 (i.e., the inner ball groove 21 located closest to the viewer in the predetermined side view) is inclined at the angle (α+ß) relative to the central axis O1 of the outer joint member 10. In the state illustrated in FIG. 2, the inclination angle of the inner ball groove 21 relative to the central axis O1 of the outer joint member 10 is at the maximum. Thus, when the inner joint member 20 moves into the tube 3 (i.e., to the left side of FIG. 2), the direction of movement of the ball 30 rolling along the inner ball groove 21 illustrated in FIG. 2 needs to be changed to a greater degree than the direction of movement of the balls 30 rolling along the other inner ball grooves 21. This makes it more difficult to guide the ball 30, rolling along the inner ball groove 21 illustrated in FIG. 2, from the inner ball groove 21 to the escape region 23 than to guide the balls 30, rolling along the other inner ball grooves 21, from the inner ball grooves 21 to the escape region 23.

The inclination angle γ of the escape portion 22 relative to the central axis O2 of the inner joint member 20 is set to be equal to or greater than the maximum joint angle ß. This enables the ball 30, rolling along the inner ball groove 21 illustrated in FIG. 2, to be detached from the inner joint member 20 without being caught by the escape portion 22. Thus, the constant velocity joint 100 enables smooth disengagement of the inner joint member 20 from the cage 40.

As described above, the inner joint member 20 of the constant velocity joint 100 is provided with the escape portions 22 to allow escape of the balls 30 from the inner ball grooves 21 upon application of an excessive load to the constant velocity joint 100. Thus, when the balls 30 enter a region where the escape portions 22 are provided (i.e., the escape region 23) from the inner ball grooves 21, the balls 30 are guided toward the first side of the central axis O2 of the inner joint member 20 (i.e., the right side of FIG. 2) by the outer ball grooves 11, so that the balls 30 are detached from the inner joint member 20. The constant velocity joint 100 enables the inner joint member 20 to be disengaged from the cage 40 and moved to the second side of the central axis O1 of the outer joint member 10 (i.e., to the region where the tube 3 is provided). Consequently, the constant velocity joint 100 enables the inner joint member 20, disengaged from the cage 40, and the stub shaft 2 to move into the inner space of the tube 3 so as to absorb impact caused by the load applied to the stub shaft 2.

Thus, the constant velocity joint 100 enables detachment of the balls 30 from the inner joint member 20 and disengagement of the inner joint member 20 from the cage 40 without greatly increasing the range of motion of the balls 30 in the circumferential direction relative to the cage 40. Accordingly, when the constant velocity joint 100 is used as a cross groove joint that enables disengagement of the inner joint member 20 from the cage 40 upon application of an excessive load, this embodiment prevents an increase in the circumferential dimension of each window 41. In other words, this embodiment enables an increase in the widthwise dimension of each cage bar provided between the windows 41 circumferentially adjacent to each other. This prevents a reduction in strength of the cage 40.

In this embodiment, each escape portion 22 is provided only between the first rolling guide lateral surface 21b of the associated inner ball groove 21 and the end face 20a located at the first side of the central axis O2 of the inner joint member 20. This simplifies the shape of the inner joint member 20.

The maximum outside diameter D4 of the inner joint member 20 is smaller than the minimum bore diameter D3 of the cage 40. Thus, when the balls 30 enter the escape portions 22, the balls 30 do not interfere with the cage 40. This enables smooth disengagement of the inner joint member 20 from the cage 40.

The above embodiment has been described on the assumption that the inclination angle γ of the escape portion 22 relative to the central axis O2 of the inner joint member 20 is set to be equal to or greater than the maximum joint angle ß. The invention, however, is not limited to this embodiment. The escape portion 22 is only required to be provided such that an angle formed between an inclined direction R of the escape portion 22 and an inclined direction G of the inner ball groove 21 is greater than the inclination angle α of the inner ball groove 21 relative to the central axis O2 of the inner joint member 20. The inclination angle α is an angle formed between the first rolling guide lateral surface 21b of the inner ball groove 21 and the central axis O2 of the inner joint member 20.

Figure 5:
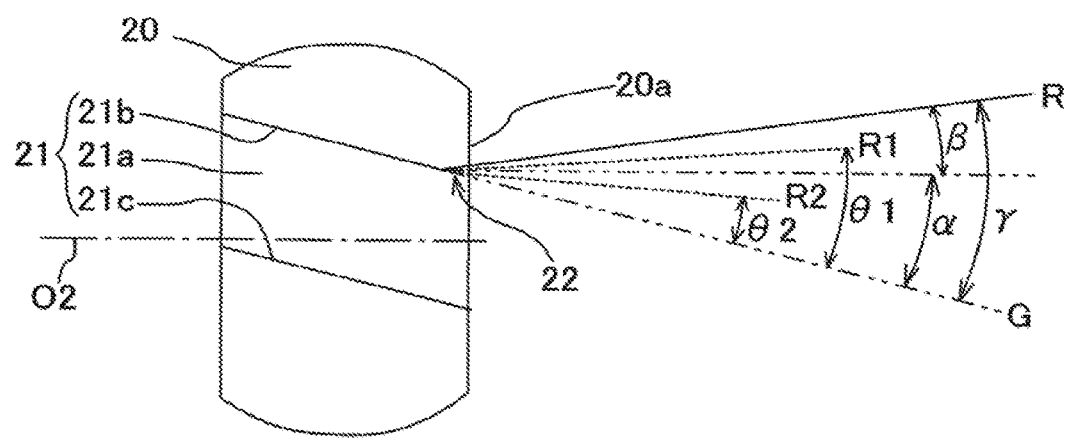
FIG. 5 is a diagram illustrating a variation of the escape portion.

In one example, as illustrated in FIG. 5, a value θ1 may be set to be the value of an angle formed between an inclined direction R1 of the escape portion 22 and the inclined direction G of the inner ball groove 21. The value θ1 is equal to or greater than the value of the inclination angle α of the inner ball groove 21 and is smaller than the sum of the value of the inclination angle α of the inner ball groove 21 and the value of the maximum joint angle ß. In this example, at least the ball 30 that rolls along the inner ball groove 21 having the smallest inclination angle relative to the central axis O1 of the outer joint member 10 (i.e., the inner ball groove 21 located closest to the viewer in the predetermined side view) will not be caught by the escape portion 22 and will thus be detached from the inner joint member 20. The joint angle is zero degrees in the predetermined side view.

Referring still to FIG. 5, a value θ2 may be set to be the value of an angle formed between an inclined direction R2 of the escape portion 22 and the inclined direction G of the inner ball groove 21. The value θ2 is smaller than the inclination angle α of the inner ball groove 21. In this example, detachment of the ball 30 from the inner joint member 20 is enabled by increasing the circumferential dimension of the window 41 (see FIG. 1) of the cage 40. In this example as well, the circumferential dimension of the window 41 may be smaller than when the inner joint member 20 is provided with no escape portion 22. Thus, this example prevents a reduction in strength of the cage 40.

The above embodiment has been described on the assumption that each escape portion 22 is provided only at the first side of the central axis O2 of the inner joint member 20. The invention, however, is not limited to this embodiment. Alternatively, each escape portion 22 may be provided at any position other than between the first rolling guide lateral surface 21b of the associated inner ball groove 21 and the end face 20a located at the first side of the central axis O2 of the inner joint member 20, or additional escape portion(s) 22 may be provided in addition to the escape portions 22 each provided between the first rolling guide lateral surface 21b of the associated inner ball groove 21 and the end face 20a. Specifically, the escape portion(s) 22 may be provided between the first rolling guide lateral surface 21b and the end face 20b, between the second rolling guide lateral surface 21c and the end face 20a, and/or between the second rolling guide lateral surface 21c and the end face 20b. Such a variation also enables detachment of the balls 30 from the inner joint member 20 upon application of an excessive load to the inner joint member 20.

The above embodiment has been described on the assumption that the maximum outside diameter D4 of the inner joint member 20 is smaller than the minimum bore diameter D3 of the cage 40. The invention, however, is not limited to this embodiment. The inner joint member 20 is only required to be disengageable from the cage 40 upon application of an excessive load to the inner joint member 20. The maximum outside diameter D4 of the inner joint member 20 may be equal or substantially equal to the minimum bore diameter D3 of the cage 40 or may be slightly larger than the minimum bore diameter D3 of the cage 40 as long as the inner joint member 20 is disengageable from the cage 40 upon application of an excessive load to the inner joint member 20.

As described above, the constant velocity joint 100 according to this embodiment of the invention includes: the tubular outer joint member 10; the inner joint member 20 disposed inward of the outer joint member 10; a plurality of the balls 30 to transmit torque between the outer joint member 10 and the inner joint member 20; and the cage 40 disposed between the inner peripheral surface of the outer joint member 10 and the outer peripheral surface of the inner joint member 20 and including the windows 41 each configured to hold an associated one of the balls 30. The outer joint member 10 includes the outer ball grooves 11 each extending in an inclined direction relative to the central axis O1 of the outer joint member 10. The inner joint member 20 includes the inner ball grooves 21 each extending in an inclined direction relative to the central axis O2 of the inner joint member 20. Each of the balls 30 is rollably supported by an associated one of the outer ball grooves 11 and an associated one of the inner ball grooves 21. The associated outer ball groove 11 and the associated inner ball groove 21 face each other such that the inclined direction of the outer ball groove 11 relative to the central axis O1 of the outer joint member 10 is opposite to the inclined direction of the inner ball groove 21 relative to the central axis O2 of the inner joint member 20.

The inner joint member 20 further includes the escape portions 22 configured to allow escape of the balls 30 from the inner ball grooves 21 to the first side of the central axis O2 of the inner joint member 20. Each of the escape portions 22 is provided at least between the end face 20a located at the first side of the central axis O2 of the inner joint member 20 and a rolling guide lateral surface (e.g., the first rolling guide lateral surface 21b) of an associated one of the inner ball grooves 21 that forms an acute angle with the end face 20a.

The constant velocity joint 100 is configured such that when the balls 30 enter a region where the escape portions 22 are provided (i.e., the escape region 23) from the inner ball grooves 21 upon application of an excessive load to the constant velocity joint 100, the balls 30 are guided to the first side of the central axis O2 of the inner joint member 20 by the outer ball grooves 11 and detached from the inner joint member 20. Detachment of the balls 30 from the inner joint member 20 enables disengagement of the inner joint member 20 from the outer joint member 10, the cage 40, and the balls 30. Thus, the inner joint member 20 is movable relative to the outer joint member 10, the cage 40, and the balls 30.

In this embodiment, an increase in the circumferential dimension of each window 41 of the constant velocity joint 100 is prevented more effectively than when no escape portions 22 are provided. Thus, the constant velocity joint 100 enables disengagement of the inner joint member 20 from the cage 40 upon application of an excessive load, while preventing a reduction in strength of the cage 40.

The inner joint member 20 of the constant velocity joint 100 described above is coupled to the stub shaft 2 extending to the first side of the central axis O2 of the inner joint member 20, with the stub shaft 2 coaxial with the central axis O2 of the inner joint member 20. Each of the escape portions 22 is provided only between the end face 20a located at the first side of the central axis O2 of the inner joint member 20 and a rolling guide lateral surface (e.g., the first rolling guide lateral surface 21b) of an associated one of the inner ball grooves 21 that forms an acute angle with the end face 20a.

The constant velocity joint 100 enables the inner joint member 20 coupled to the stub shaft 2 to be disengaged from the cage 40 upon application of an excessive load to the stub shaft 2. This allows the constant velocity joint 100 to absorb impact caused by the load applied to the stub shaft 2. The shape of the inner joint member 20 is simplified, because each of the escape portions 22 is provided only between the end face 20a located at the first side of the central axis O2 of the inner joint member 20 and a rolling guide lateral surface (e.g., the first rolling guide lateral surface 21b) of the associated inner ball groove 21.

The constant velocity joint 100 described above is configured such that the maximum outside diameter D4 of the inner joint member 20 is smaller than the minimum bore diameter D3 of the cage 40. Thus, the constant velocity joint 100 enables smooth disengagement of the inner joint member 20 from the cage 40 when the balls 30 enter the escape portions 22.

The above-described constant velocity joint 100 is configured such that each escape portion 22 guides an associated one of the balls 30 in an inclined direction relative to the central axis O2 of the inner joint member 20. This inclined direction is opposite to the inclined direction of an associated one of the inner ball grooves 21. Thus, the constant velocity joint 100 enables smooth detachment of the balls 30 from the inner joint member 20.

The above-described constant velocity joint 100 is configured such that the inclination angle γ of each escape portion 22 relative to the central axis O2 of the inner joint member 20 is set to be equal to or greater than the maximum joint angle ß formed between the central axis O2 of the inner joint member 20 and the central axis O1 of the outer joint member 10. Thus, the constant velocity joint 100 enables smooth detachment of all the balls 30 from the inner joint member 20. Consequently, the constant velocity joint 100 enables smooth disengagement of the inner joint member 20 from the cage 40.

What is claimed is:

1. A constant velocity joint comprising:
    a tubular outer joint member;
    an inner joint member disposed inward of the outer joint member;
    a plurality of balls to transmit torque between the outer joint member and the inner joint member; and
    a cage disposed between an inner peripheral surface of the outer joint member and an outer peripheral surface of the inner joint member, the cage including windows each configured to hold an associated one of the balls, wherein
    the outer joint member includes outer ball grooves each extending in an inclined direction relative to a central axis of the outer joint member,
    the inner joint member includes inner ball grooves each extending in an inclined direction relative to a central axis of the inner joint member,
    each of the balls is rollably supported by an associated one of the outer ball grooves and an associated one of the inner ball grooves, the associated outer ball groove and the associated inner ball groove facing each other such that the inclined direction of the associated outer ball groove relative to the central axis of the outer joint member is opposite to the inclined direction of the associated inner ball groove relative to the central axis of the inner joint member, and
    the inner joint member further includes escape portions configured to allow escape of the balls from the inner ball grooves to a first side of the central axis of the inner joint member, each of the escape portions being provided at least between an end face of the inner joint member located at the first side of the central axis of the inner joint member and a rolling guide lateral surface of an associated one of the inner ball grooves that forms an acute angle with the end face.

2. The constant velocity joint according to claim 1, wherein
    the inner joint member is coupled to a stub shaft extending to the first side of the central axis of the inner joint member, with the stub shaft coaxial with the central axis of the inner joint member, and
    each of the escape portions is provided only between the end face located at the first side of the central axis of the inner joint member and the rolling guide lateral surface of an associated one of the inner ball grooves that forms an acute angle with the end face.

3. The constant velocity joint according to claim 1, wherein
    a maximum outside diameter of the inner joint member is smaller than a minimum bore diameter of the cage.

4. The constant velocity joint according to claim 1, wherein
    each of the escape portions guides an associated one of the balls in an inclined direction relative to the central axis of the inner joint member, the inclined direction being opposite to the inclined direction of an associated one of the inner ball grooves.

5. The constant velocity joint according to claim 4, wherein
    an inclination angle of each of the escape portions relative to the central axis of the inner joint member is set to be equal to or greater than a maximum joint angle formed between the central axis of the inner joint member and the central axis of the outer joint member.

* * * * *